US006819984B1

(12) United States Patent
Bedckman et al.

(10) Patent No.: US 6,819,984 B1
(45) Date of Patent: Nov. 16, 2004

(54) LOST 2—A POSITIONING SYSTEM FOR UNDER WATER VESSELS

(75) Inventors: Richard R. Bedckman, Slidell, LA (US); Andrew B. Martinez, New Orleans, LA (US); Brian S. Bourgeois, Slidell, LA (US)

(73) Assignee: The United States of America as represented by the Secretary of the Navy, Washington, D.C.

( * ) Notice: Subject to any disclaimer, the term of this patent is extended or adjusted under 35 U.S.C. 154(b) by 341 days.

(21) Appl. No.: 09/905,706

(22) Filed: May 11, 2001

(51) Int. Cl.$^7$ .............................................. G01S 15/06
(52) U.S. Cl. ..................... 701/21; 367/124; 367/130; 367/131
(58) Field of Search ................. 701/21, 207; 367/99, 367/106, 124, 130, 131

(56) References Cited

U.S. PATENT DOCUMENTS

| | | | | | |
|---|---|---|---|---|---|
| 3,860,900 | A | * | 1/1975 | Scudder | 367/6 |
| 3,905,007 | A | * | 9/1975 | Koesy | 367/2 |
| 4,229,809 | A | * | 10/1980 | Schwalbe | 367/6 |
| 4,315,326 | A | * | 2/1982 | Chase, Jr. | 367/134 |
| 4,559,621 | A | * | 12/1985 | Delignieres | 367/130 |
| 4,635,236 | A | * | 1/1987 | Roberts | 367/19 |
| 5,047,990 | A | * | 9/1991 | Gafos et al. | 367/6 |
| 6,256,264 | B1 | * | 7/2001 | Beckman et al. | 367/130 |
| 2003/0078706 | A1 | * | 4/2003 | Larsen | 701/21 |

* cited by examiner

*Primary Examiner*—Gary Chin
(74) *Attorney, Agent, or Firm*—John J. Karasek; Sally A. Ferrett

(57) ABSTRACT

A system for the accurate determination of the position of an underwater vehicle comprising a system observer subsystem having a state velocity update module, a terrain matching module, means for generating a prediction of the terrain matching module's performance and a constrained extended Kalman filter subsystem. The constrained extended Kalman filter subsystem includes a steady state extended Kalman filter, a non-linear constraint module, and a state predictor. The system observer integrates bathymetry data corresponding to the area of the submersible vehicle, with the vessel's measured ocean depth, the vessel's predicted state, the vessel's measured velocity into a terrain based state estimate, a final predicted state, the Kalman filter takes the terrain based state estimate, the final predicted state, the measured slant range and the location of the known point and computes the final estimate of the vessel's position and a prediction of the vessel's position at the next time step. A method for the accurate determination of the position of at least one underwater vehicle comprising the steps of (1) acoustically coupling at least one underwater vehicle to a sea borne position marker having a known position; (2) predicting the at least one underwater vehicle's position, based on a past estimate of the underwater vehicle's position, and an estimate of its velocity over the sea bottom; (3) estimating the underwater vehicle's position utilizing measured ocean depth at the underwater vehicle's position, bathymetry data and the underwater vehicle's predicted position in a single point terrain match; (4) computing a estimate of the underwater vehicle's position based on the prediction of the at least one underwater vehicle's position based on vehicle dynamics and the estimated underwater vehicles position based on ocean depth and bathymetry data; and (5) computing a corrected estimate of the at least one submersible vehicle's position that utilizes the estimate of the underwater vehicle's position and a measured slant range from the at least one submersible vehicle to the sea borne position marker whose position is known.

16 Claims, 14 Drawing Sheets

TRANSPONDERS

LOST 2— A POSITIONING SYSTEM FOR UNDER WATER VESSELS

BACKGROUND OF THE INVENTION

1. Field of the Invention

This invention pertains in general to a system and method for the accurate estimation of the position of and underwater vehicle and more particularly to a system and method for the estimation and tracking of an underwater vehicle's position using a combination of bathymetry data, and the underwater vehicles dynamics data in relation to a position marker.

2. Description of the Prior Art

Under water vehicles are in common use for surveying and locating objects in the ocean due to their relatively low operation cost. To be useful however, the position of an underwater vehicle must be known so that the data collected by the towed vehicle's sensors can be georectified. Due to ocean dynamics, currents, waves, temperature fluctuation etc., acting on underwater vehicle's tether or on the vehicle itself, a submerged vehicles position relative to the towing vehicle or some other georectified point is often difficult to determine. Since the ocean is opaque to high-frequency electromagnetic signals, the global positioning system (GPS) generally cannot be used for submerged vehicle positioning.

Current methods for determining the position of a underwater vehicle include the lay-back model (See, FIG. 1), the long base line (LBL) model (See FIG. 2), the short base line (SBL) model (See FIG. 3), the inverted SBL system and the Localization System (LOST)(See FIG. 4). These system are generally configured to manage the position of a tethered or towed vehicle and are ill equipped for an remote or untethered underwater vehicle.

With the lay-back model method the underwater vehicle is tethered and is assumed to be directly behind the towing vehicle and the lay-back (distance from the towing vehicle) is assumed to be a fixed multiple of the tow vehicle's depth. Alternatively, the amount of cable paid out is assumed to be the slant range to the tow vehicle. The inverted SLB method does not take into account the cable's cantilever. Neither the lay-back the LBL, nor the SLB methods take in account the effects of local current on the cables' shape and position. The accuracy of these methods will in general suffer as a function of time and therefore not support precise positioning of the towed vehicle.

The LBL method uses a series of acoustic transponders to localize the tow-vehicle by measuring the time delays between the tow-vehicle and the transponders. These transponders may be bottom mounted or localized on the surface, as shown in U.S. Pat. No. 5,119,341. While these systems are very accurate, their deployment is a time consuming and expensive operation. Furthermore the LBL method requires that the systems be redeployed to each operational area.

The SBL method uses time delay and measured arrival angle of an acoustic signal from the tow-vehicle to the towing vehicle to compute position. These systems are fairly accurate but their resolution is range dependent. Typically, in order to achieve sufficient accuracy, a SBL system is deployed over the tow-vehicle, requiring a second surface craft-an obvious economic disadvantage.

With the inverted SBL method, the directional acoustic receiver is mounted on the towed vehicle instead of the towing vehicle. As a consequence the range dependent accuracy of this system is a problem for very deep water operation. SBL and inverted SBL systems cannot be readily used in applications other than ship towed systems.

The LOST-1, localization method, generates the position of a towed underwater vehicle via the use of bathymetry data collected by the towing vessel and the depth range of the underwater vehicle from the towing vessel as shown in U.S. Pat. No. 6,256,264 incorporated herein by reference. LOST-1 uses a single dimensional model to generate the underwater vehicle's position assuming the underwater vehicles position along track does not change. This feature limits the deployment of the underwater vehicle to an area directly behind the tow vessel in order to achieve sufficient accuracy.

SUMMARY

A system for the accurate determination of the position of an underwater vehicle comprising a system observer subsystem having a state velocity update module, a terrain matching module, means for generating a prediction of the terrain matching module's performance and a constrained extended Kalman filter subsystem. The constrained extended Kalman filter subsystem includes a steady state extended Kalman filter, a non-linear constraint module, and a state predictor. The system observer integrates bathymetry data corresponding to the area of the submersible vehicle, with the vessel's measured ocean depth, the vessel's predicted state, and the vessel's measured velocity into a terrain based state estimate, and a final predicted state. The Kalman filter takes the terrain based state estimate, the final predicted state, the measured slant range and the location of the known point and computes the final estimate of the vessel's position and a prediction of the vessel's position at the next time step. A method for the accurate determination of the position of at least one underwater vehicle comprising the steps of (1) acoustically coupling at least one underwater vehicle to a sea borne position marker having a known position; (2) predicting the at least one underwater vehicle's position, based on a past estimate of the underwater vehicle's position, and an estimate of its velocity over the sea bottom; (3) estimating the underwater vehicle's position utilizing measured ocean depth at the underwater vehicle's position, bathymetry data and the underwater vehicle's predicted position in a single point terrain match; (4) computing a estimate of the underwater vehicle's position based on the prediction of the at least one underwater vehicle's position based on vehicle dynamics and the estimated underwater vehicles position based on ocean depth and bathymetry data; and (5) computing a corrected estimate of the at least one submersible vehicle's position that utilizes the estimate of the underwater vehicle's position and a measured slant range from the at least one submersible vehicle to the sea borne position marker whose position is known.

DETAILED DESCRIPTION

The LOST-2 underwater positioning system is a system for the accurate determination of the position of an underwater vehicle. The system and method combines parts of dead-reckoning, acoustic-based, and terrain-based positioning into a single integrated system and apply these various methods in an underwater environment. The system is designed in two basic subsystems, the system observer and the constrained extended Kalman filter. Prior to discussing the Figures a brief description of the basic architecture of each subsystem follows, however the basic grouping of the operative systems and sub systems are not limited to the descriptions below.

The LOST-2 system uses a single position marker located at some known point. The position marker is acoustically coupled to one or more submersible vehicles. This allows the underwater vehicle's range from the position marker to be computed using an acoustic ranging device. Bathymetry data and dynamic data are also employed in concert with the range data to estimate and predict the underwater vehicle's position.

The LOST-2 employs a system observer subsystem having a state velocity update module, a terrain matching module and means for generating a prediction of the underwater vehicles spatial performance. The second subsystem, the Kalman filter subsystem comprises a constrained extended Kalman filter subsystem having a steady state extended Kalman filter, a non-linear constraint module, and a state predictor.

The system observer integrates bathymetry data corresponding to the area of the submersible vehicle with the vessel's measured ocean depth, the vessel's predicted state, the vessel's measured velocity, and the measured slant range and location of a known point into a terrain based state estimate, a final predicted state and a measured slant range to the known point. This information is used by the second subsystem, the Kalman filter to generate a final estimate of the underwater vehicle's position.

Specifically, the Kalman filter takes the terrain based state estimate, the final predicted state, the measured slant range and the location of the known point and computes the final estimate of state and a prediction of the next system state to generate an estimate of the position of the underwater vessel.

Figure 1:
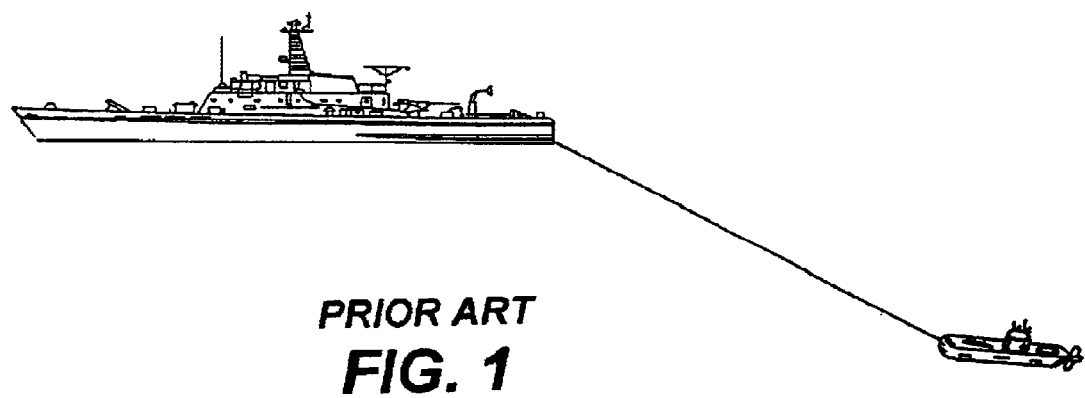
FIG. 1 shows a cable lay back method of the prior art.
Figure 2:
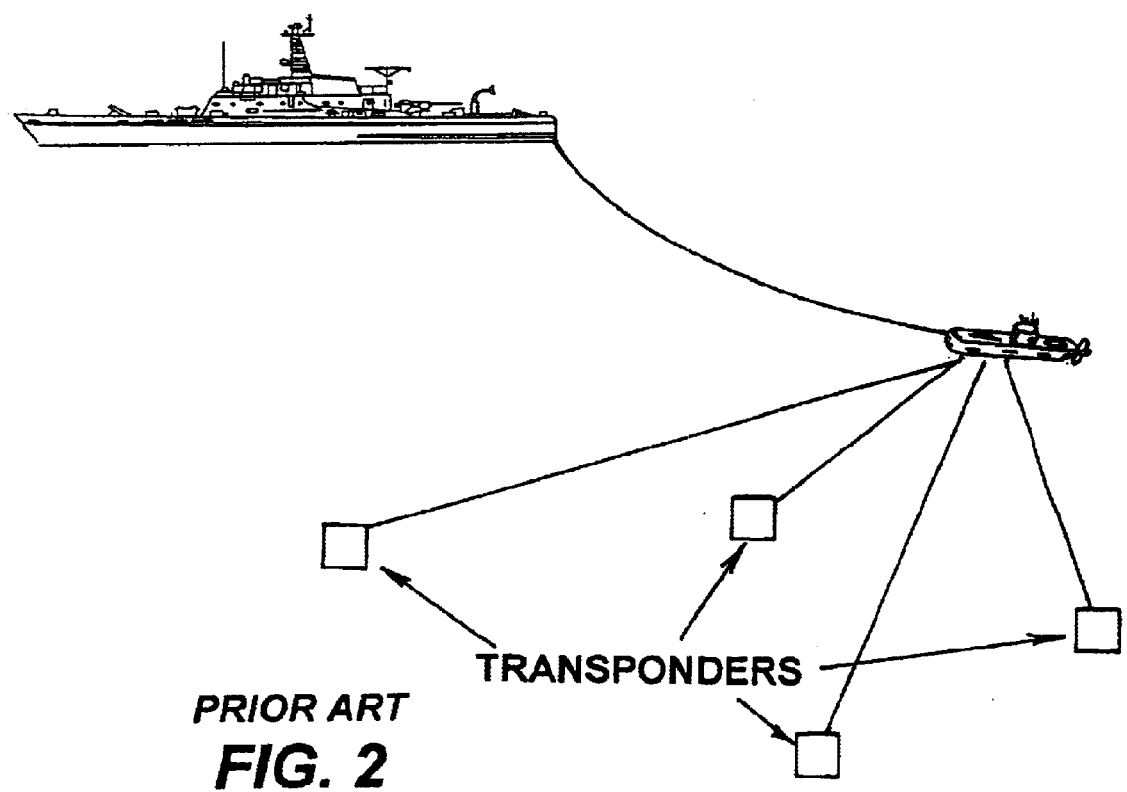
FIG. 2 shows a long base line (LBL) approach of the prior art.
Figure 3:
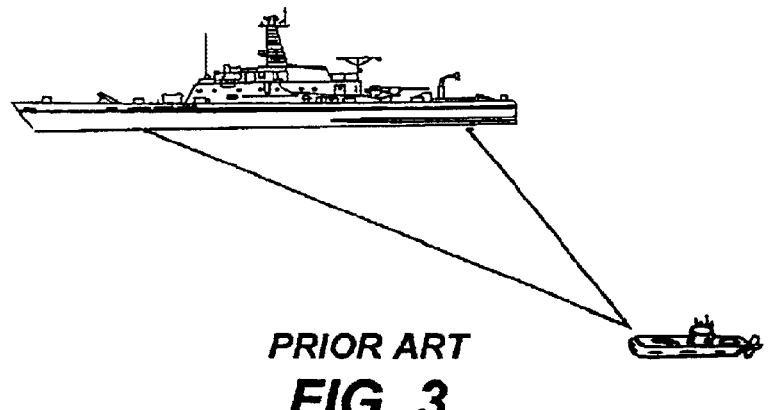
FIG. 3 shows a short base line (SBL) approach of the prior art.
Figure 4:
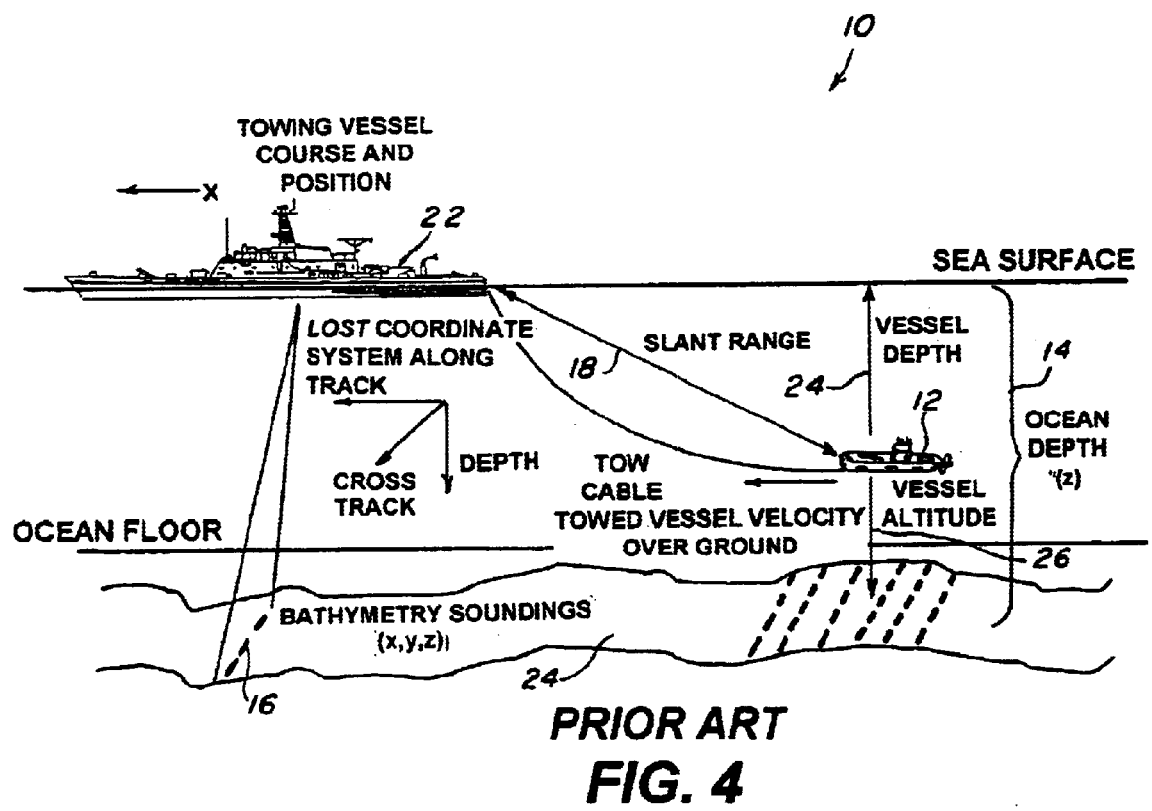
FIG. 4 shows a localization system (LOST-1) approach of the prior art.
Figure 5:
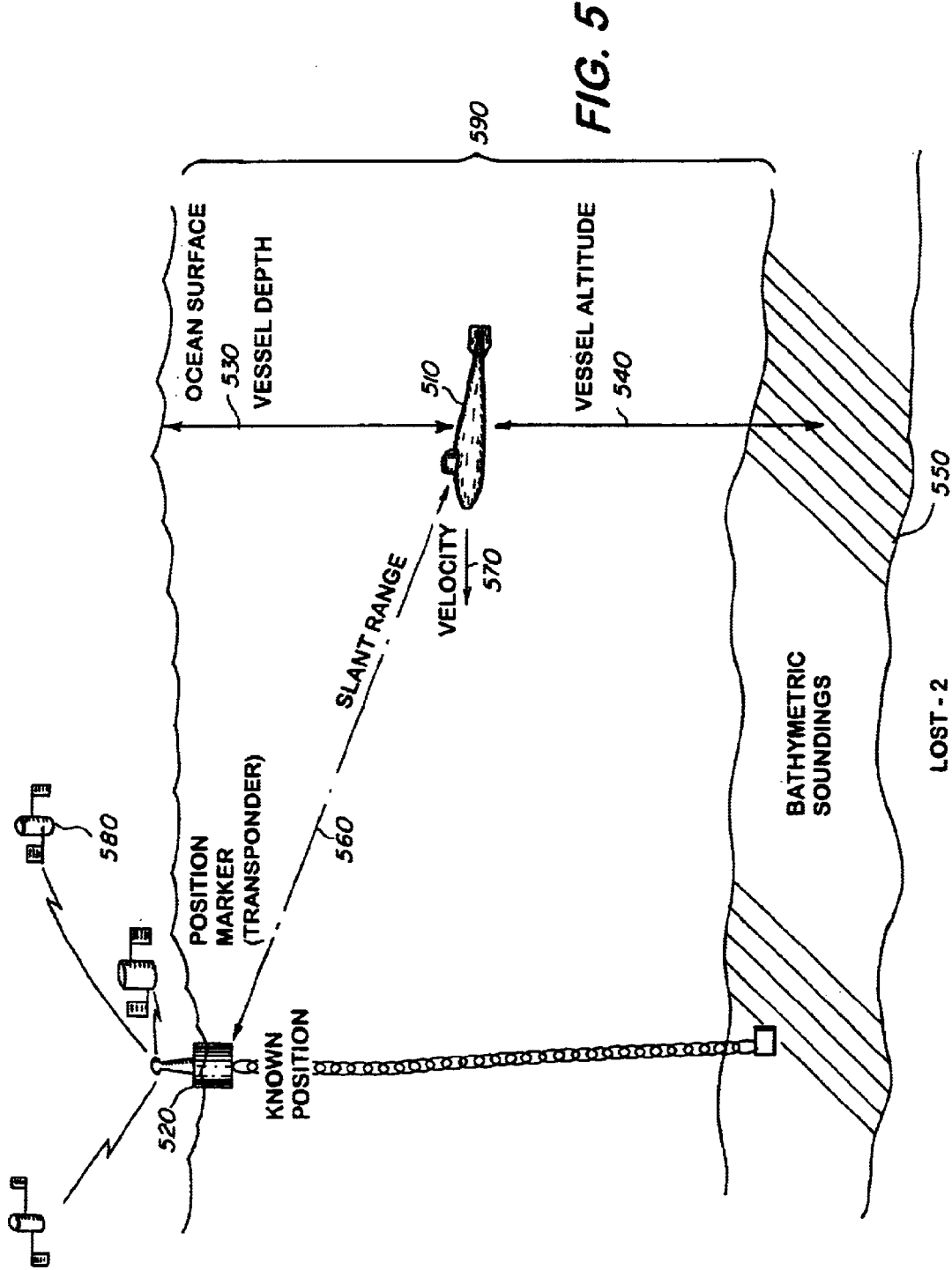
FIG. 5 shows an overview of the implementation of the LOST-2 system employing a floating buoy position marker.

Referring now to the Figures wherein, FIG. 5 shows a general overview of the implementation of an example embodiment of the LOST-2 system using a single transponder equipped buoy as the position marker. In applications where high resolution bathymetry data is available, a technique exists for the measurement of the ocean depth 590 at the position of the underwater vehicle and a technique exist for the measurement of the slant range 560 of the underwater vehicle to a position marker 520. The position marker must be easily related to a known point. A single point terrain match based on bathymetry data 550 for the local area is also used for underwater vehicle localization. LOST-2 also uses the underwater vehicle's velocity data as well as other underwater vehicle dynamic information to estimate and predict the underwater vehicle's position. In this example embodiment the underwater vehicle used is untethered, a feature allowed by the use of 2 dimensional modeling discussed below. Briefly, the LOST-2 system employs a 2 dimensional model addressing the underwater vehicle's longitudal track and the underwater vehicle's cross track. This feature allows LOST-2 to generate accurate position data when both the longitudal track as well as the cross track of the underwater vehicle vary. Via the use of 2 dimensional modeling (longitudal rack and cross track) and a single position marker, the LOST-2 system may deploy and track the location of several untethered underwater vehicles simultaneously.

The LOST-2 system requires several input parameters. These include the (1) geo-rectified, high resolution bathymetry 550 for the operational area collected during or prior to the underwater vehicle's deployment, (2) the depth 530 of the underwater vehicle 510 through the use of a pressure sensor or with an up looking acoustic ranging device, (3) the velocity of the underwater vessel 570 both course and speed (4) and the slant range 560 to the position marker 520 via a acoustic ranging device mounted on the position marker or on the underwater vehicle itself. The position marker is located at a known point which is preferably a geo-rectified 580 point. The LOST-2 system's output is the estimated geo-rectified position of the underwater vehicle 510.

Figure 6:
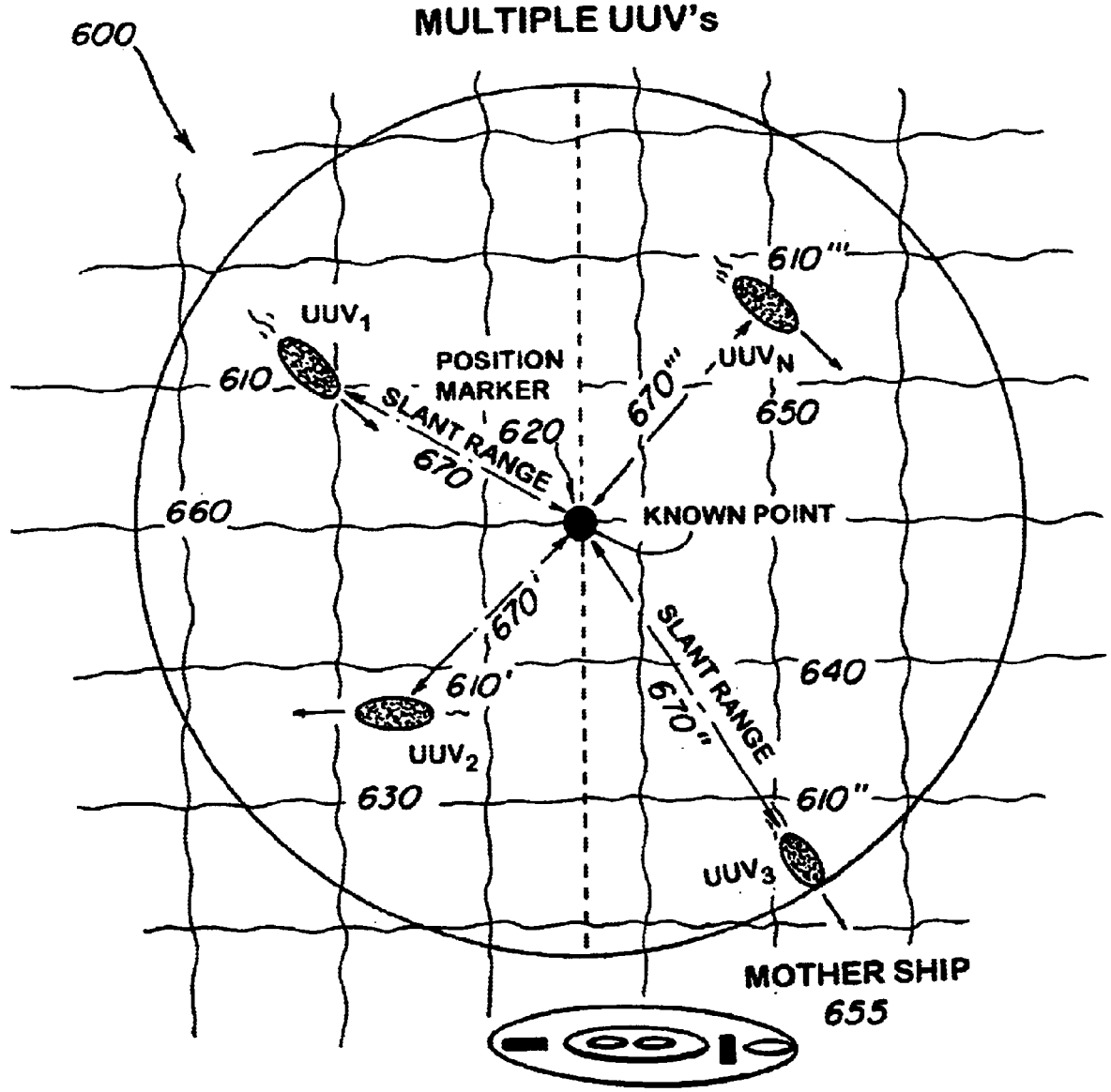
FIG. 6 shows a top view of the LOST-2 system employing multiple underwater vehicles.

FIG. 6 shows the top view of an example embodiment a LOST-2 system operating and providing the position of 4 untethered underwater vehicles simultaneously 600. A single position marker 620 having a known position is acoustically coupled to untethered underwater vehicle 610, 610', 610'', and 610'''. Preferably each underwater vehicle 610 is equipped with a simple transponder which is acoustically coupled to position marker 620 which may be a floating buoy or located on the sea floor. By acoustic coupling to the position marker, the slant range of each underwater vehicle to the single known point 670, is measured. For the area in which each of the underwater vehicles operates, there must exist bathymetry data preferably geo-rectified, and of a high resolution. When operating multiple underwater vehicle's LOST-2 requires a depth measurement for each underwater vehicle 601 and the velocity of each of the underwater vessel's including both course and speed.

Independently, for each underwater vehicle LOST-2 predicts the underwater vehicle's position, based on a past estimate of the underwater vehicle's position, and an estimate of its velocity over the sea bottom. LOST-2 then estimates the underwater vehicle's position utilizing measured ocean depth at the underwater vehicle's position, bathymetry data and the underwater vehicle's predicted position in a single point terrain match. The system then computes an estimate of the underwater vehicle's position based on the prediction of the underwater vehicle's position based on vehicle dynamics and the estimated underwater vehicles position based on ocean depth and bathymetry data. LOST-2 then computes a corrected estimate of the submersible vehicle's position that utilizing the estimate of the underwater vehicle's position and a measured slant range from the underwater vehicle to the sea borne position marker whose position is known. These steps are repeated for each underwater vehicle using bathymetry data and dynamic information relevant to that particular underwater vehicle.

Figure 7:
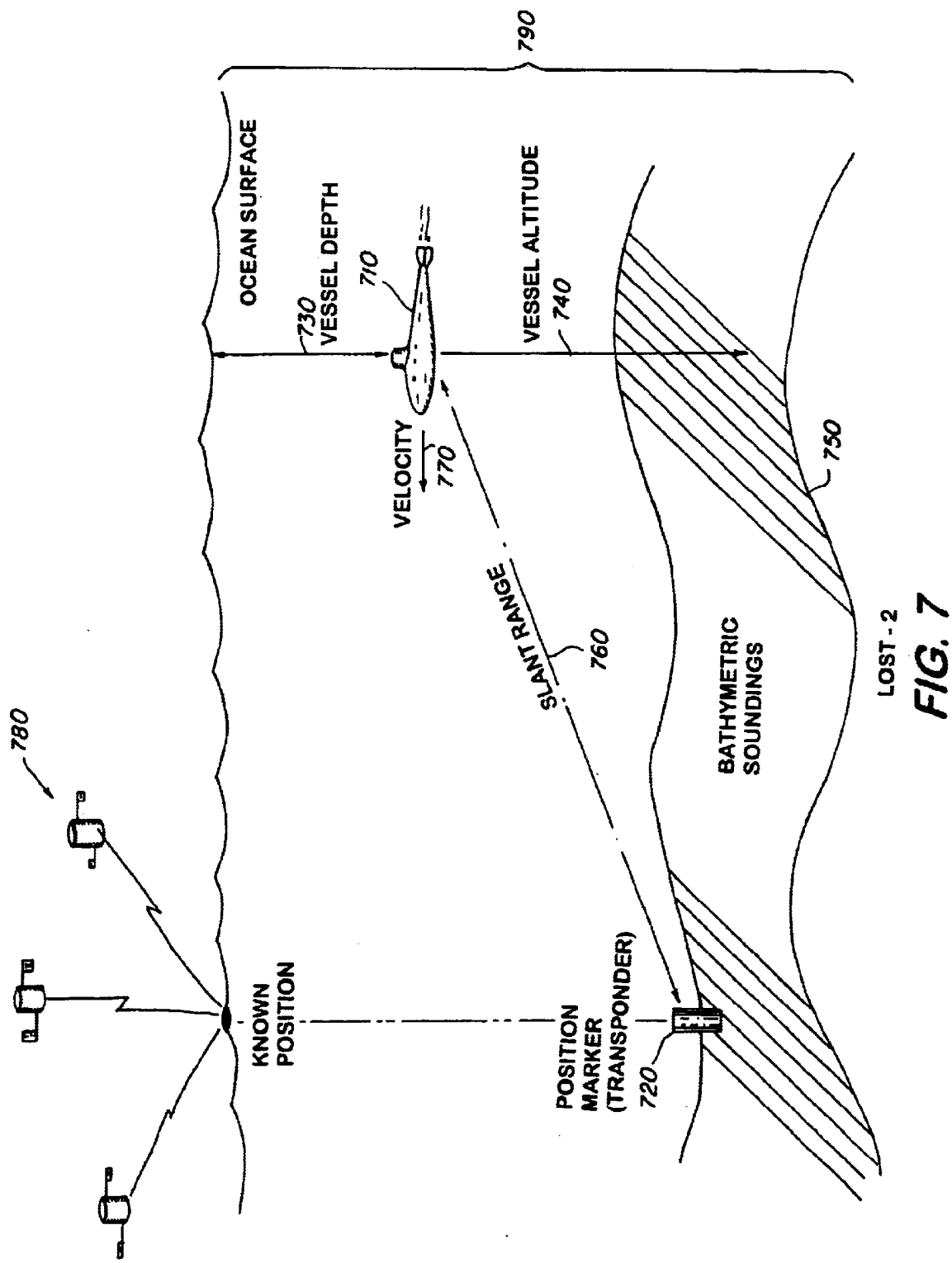
FIG. 7 shows an example implementation of the LOST-2 system employing a position marker anchored on the sea floor.

FIG. 7 shows yet another example embodiment of the LOST-2. This embodiment of the LOST-2 system also uses a single position marker 720 located on the sea floor acoustically coupled to underwater vehicle 710. Similar to the example embodiment shown in FIG. 5 the position marker is located at a known position, preferably the location of the position marker is geo-rectified.

Figure 8:
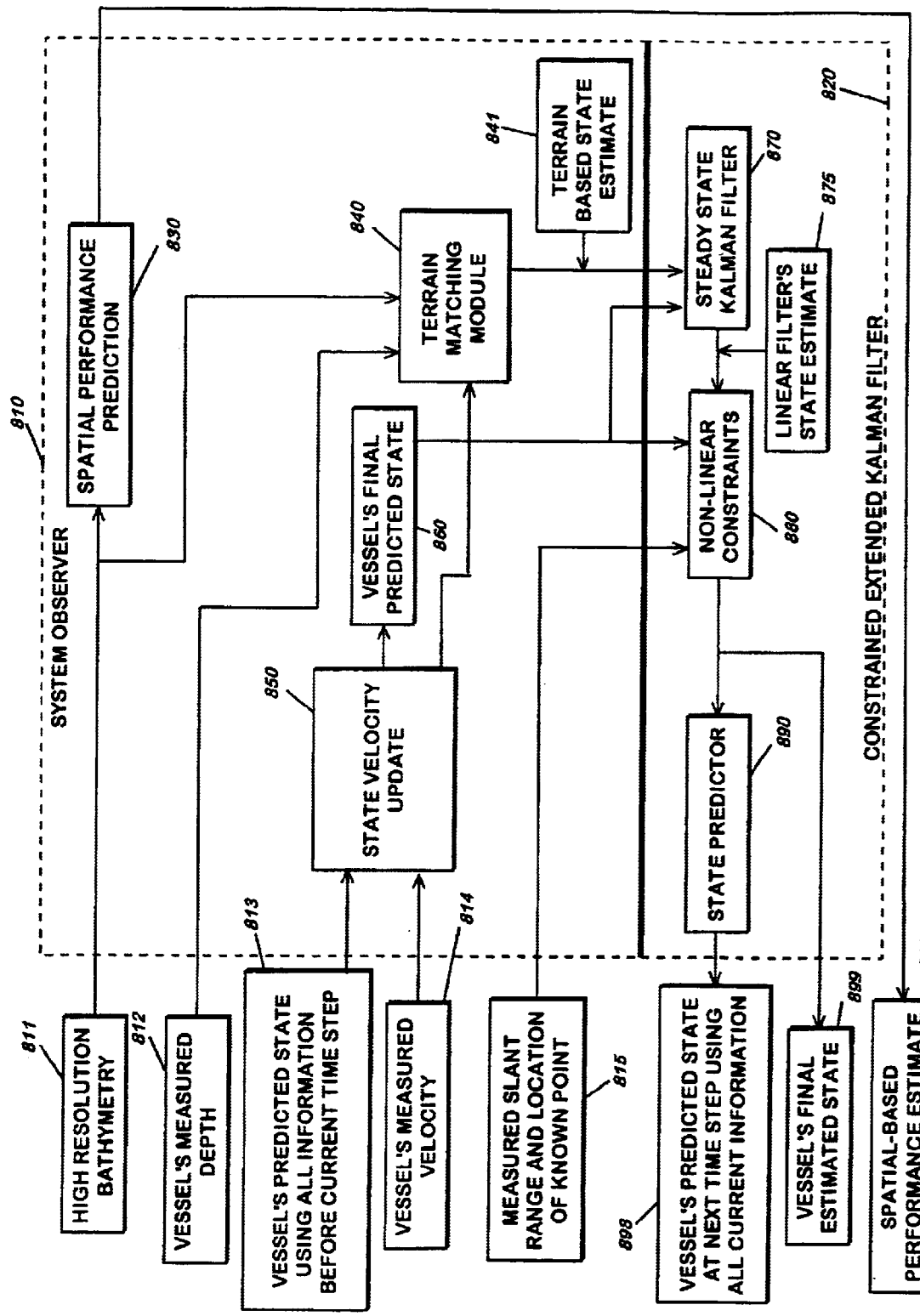
FIG. 8 shows a block diagram of the LOST-2 system.

FIG. 8 shows a block diagram of the algorithm employed by the LOST-2 system. The LOST-2 system comprises two basic subsystems, the system observer 810 and the constrained extended Kalman filter 820. These two subsystems are composed of six modules. The basic grouping of the operative modules and sub systems are not limited to the groupings as described above or below.

The system observer subsystem is composed of three modules: a state velocity update 850, terrain matching module 840, and means for generating a prediction of the terrain mapping performance shown in this example as spatial performance prediction module 830.

The constrained extended Kalman filter subsystem 820 consists of three modules: a steady state extended Kalman filter 870, a non-linear constraint module 880, and a state predictor 890.

System observer 810 takes in all the available measurements and generates two position estimates, one from Newtonian motion and the other based on the terrain in the area. As shown in FIG. 8, system observer 810 integrates the high resolution bathymetry 811, vessel's measured ocean depth 812, vessel's predicted state 13, the vessel's measured velocity 814, and the measured slant range and location of the known point 815 into the terrain based state estimate 841. The system outputs the terrain based state estimate 841, a final predicted state 860 and the measured slant range and location of the known point. The system observer also computes a prediction of the performance of the terrain mapping system shown in FIG. 8 as a spatial performance estimate 831.

The constrained extended Kalman filter 820 takes the terrain based state estimate 841, a final predicted state 860, the measured slant range and location of the known point 815 and computes the final estimate of state 899 and a prediction of the system state at the next time step 898.

The inputs the system requires are a detailed, high resolution bathymetric map in the operational area 811, a slant range to a known position 815, an estimate of the underwater vehicle's state 813, a measured or estimated velocity 814 and the depth of the ocean at the position of the underwater vehicle 812.

Referring again to the embodiment shown in FIG. 5, the high resolution bathymetric map in the operational area is shown as 550, the slant range to a known position 560 is effective the range from underwater vehicle 510 to position marker 520, an estimate of the underwater vehicle's state which is generated by the LOST-2 system (not shown), a measured or estimated velocity of the underwater vehicle 570 and the depth of the ocean 590 at the position of underwater vehicle 510. These inputs are used in conjunction with the output of the other modules to generate an accurate estimate of the position of the underwater vessel 510.

Figure 9:
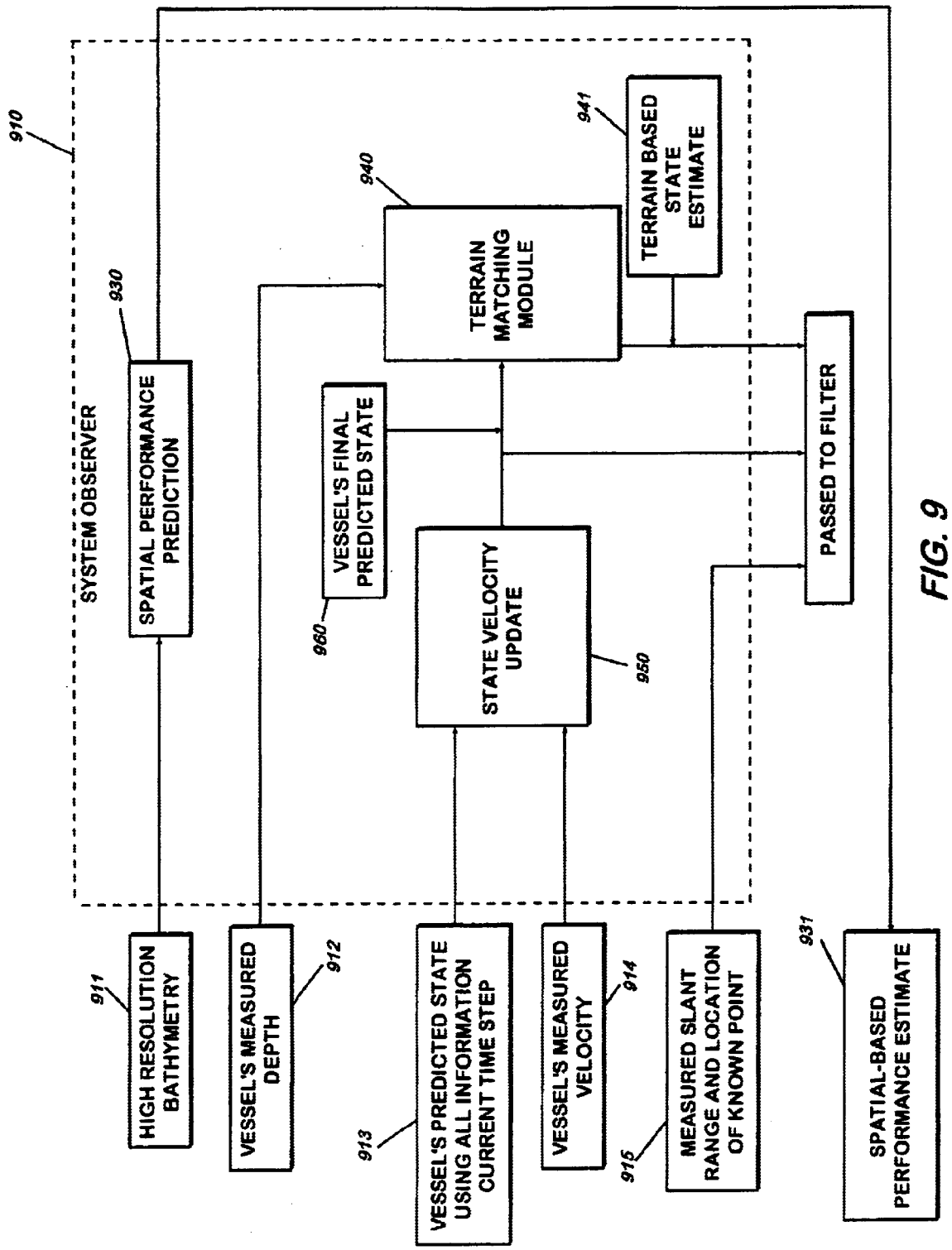
FIG. 9 shows a block diagram of the system observer subsystem.

FIG. 9 shows a block diagram of the System Observer subsystem 910. As stated earlier, this subsystem's primary function is to generate all the predictions of the state that are required by the constrained extended Kalman filter. It also provides a prediction of performance based on the spatial distribution of the bathymetry. This subsystem integrates the high resolution bathymetry, vessel's measured ocean depth, vessel's predicted state, the vessel's measured velocity, and the measured slant range and location of the known point into the terrain based state estimate. The subsystem's outputs are the terrain based state estimate, the final predicted state and the measured slant range and location of the known point.

Figure 10:
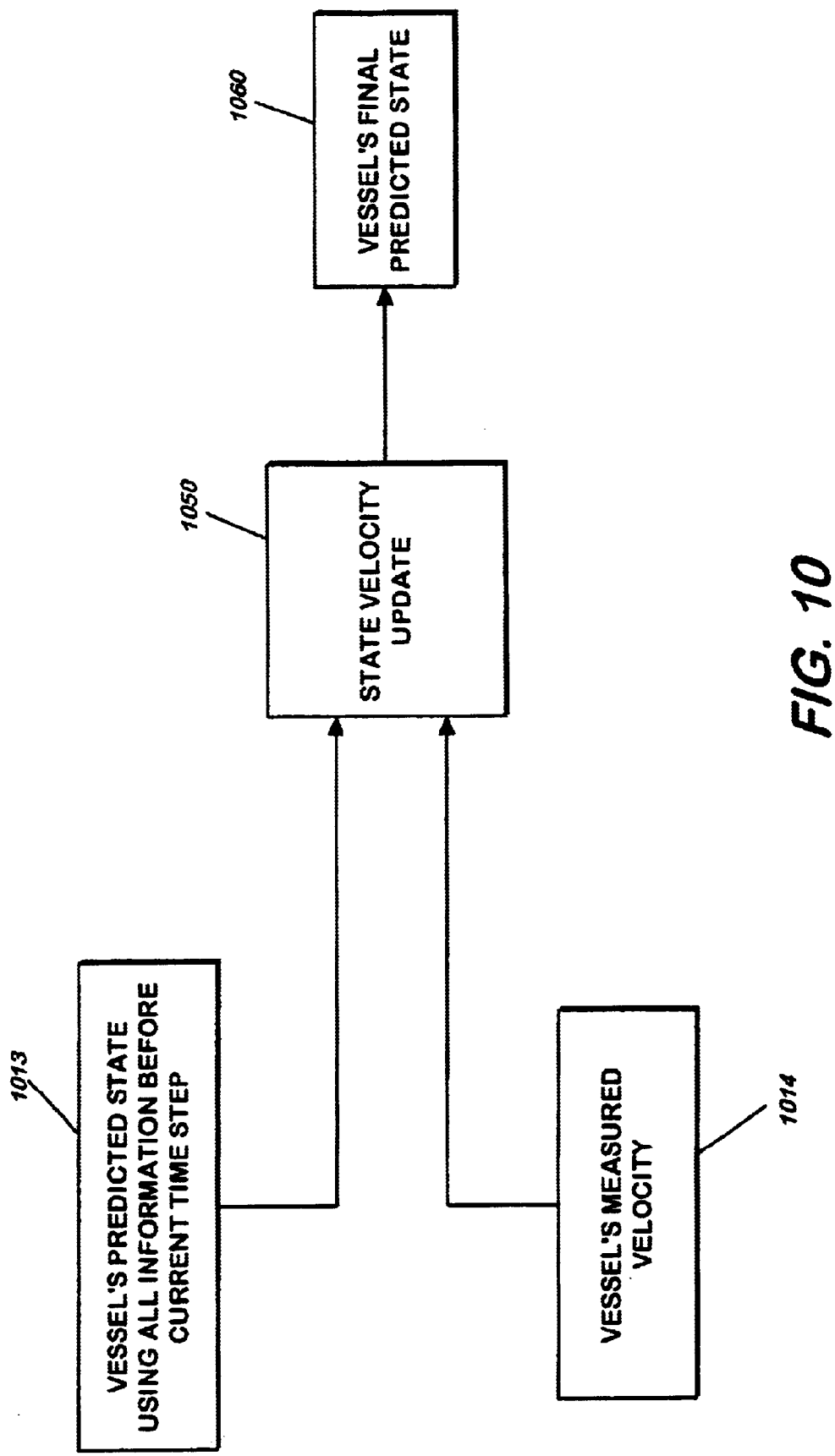
FIG. 10 shows a block diagram of the signal flow of the state velocity update module.

The first subsystem component is the state velocity update, whose signal flow diagram is shown in FIG. 10. The state velocity update module 850 serves to provide an estimated location of the underwater body. It does this by combining the best available velocity 814 (speed and heading), and the best estimate of state 830 to produce the best estimate state prior to the terrain match. This module then outputs the predicted state 840 at the present time.

Figure 11:
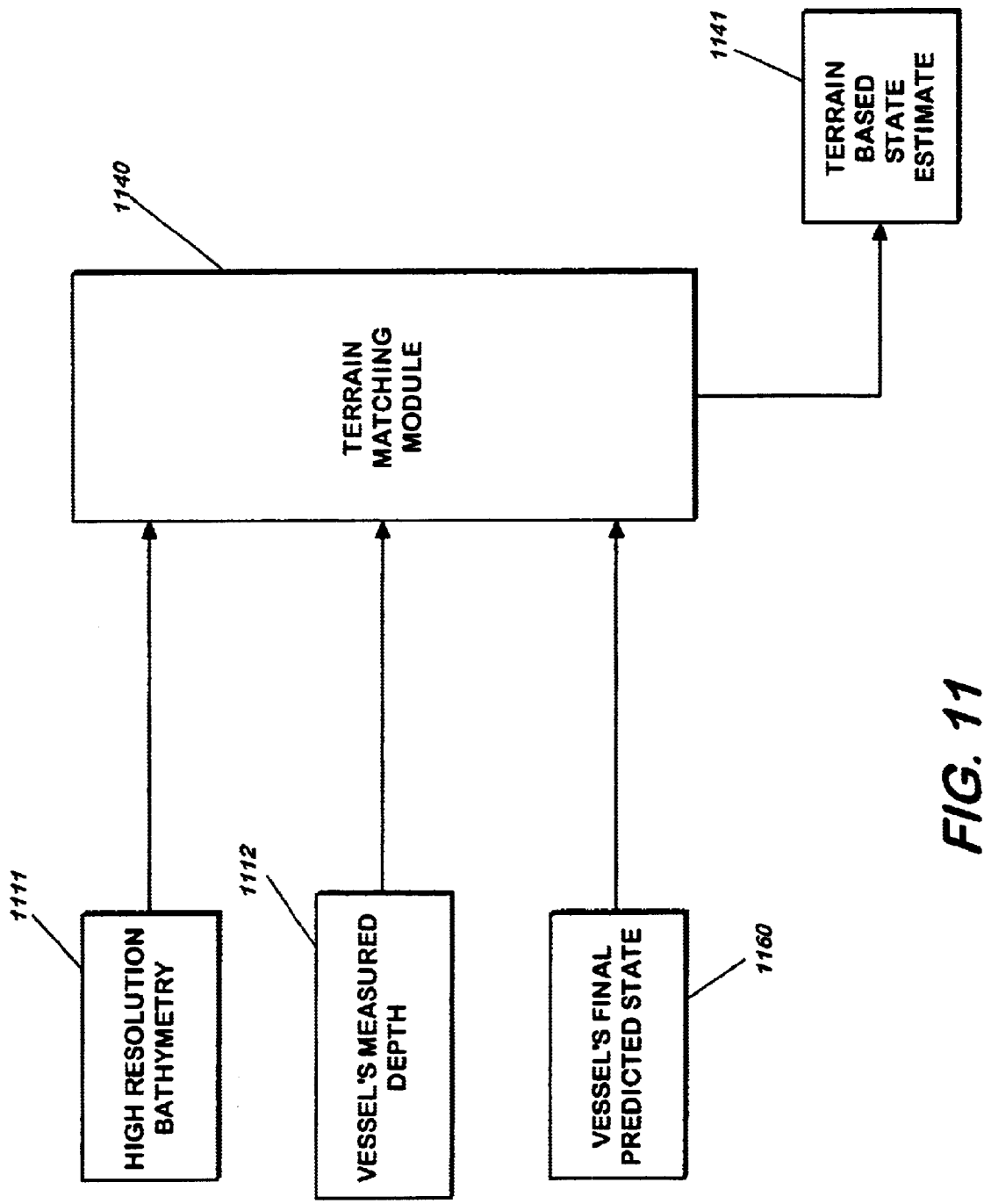
FIG. 11 shows a block diagram of the signal flow of the terrain matching module.

The output of the state velocity update 840 is sent to the terrain matching module, whose signal flow is shown as FIG. 11. The terrain matching module is the part of the system that serves as the independent system observation. The observation is preferably made by comparing the measured ocean depth 1112 to the bathymetry 1111 in the operational area. This accomplished by means of a maximum likelihood estimator. The output of this module is the terrain based state estimate 1141, which is also the independent system observation.

Figure 12:
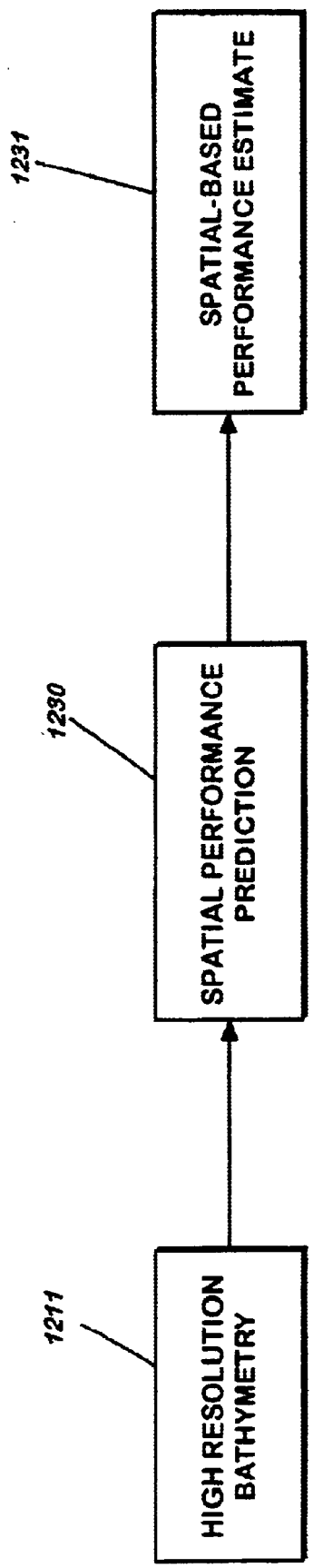
FIG. 12 shows a block diagram of the signal flow for the spatial based performance prediction module.

The final module of the system observer is the spatial based performance prediction. The signal flow is contained in FIG. 12. The spatial performance prediction module 1230 produces an estimate of how well the system is capable of performing in a given area 1231 based on the high resolution bathymetry 1211 in the area of the underwater vehicle.

The system observer generates two separate estimates of the position of the underwater body. The first position estimate is generated in the velocity update. This position estimate is then used in conjunction with bathymetry to generate the terrain based position estimate.

FIG. 10 shows a block diagram of the signal flow of the state velocity update module. The state velocity update module receives the vessel's predicted state using all of the information before the current time step 1013, and the vessel's measured velocity 1014 and computes the vessel's final predicted state 1060. The vessel's final predicted state is the underwater vehicle's position, $\chi_n$, based on a past estimate of the underwater vehicle's position, $\chi_{n|n-1}$ and an estimate of the underwater vehicle's velocity $\upsilon_n$ over the sea bottom.

The velocity update module serves as the dead-reckoning system and computes an estimated position for the vessel in the along track, cross track coordinate system based on a measured velocity vector for the underwater vessel, and the best prediction of position of the underwater vessel from the previous time step. The velocity update calculates the new position (along track, cross track) as two separate and independent processes, one in each direction. This is done throughout the system.

For each direction, the position estimate is computed by adding the measured velocity, multiplied by time as appropriate, to the previous position estimate.

The formulas used to compute each part of the estimate are:

$$\hat{x}_n^a = x_{n|n-1}^a + v_n^a \quad (3.3)$$

$$\hat{x}_n^c = x_{n|n-1}^c + v_n^c \quad (3.4)$$

where the superscripts a and c correspond to along track and cross track and v is the measured velocity. The subscript n|n−1 refers to the estimate of the state (x) at time (n) given all information available at time n−1. Therefore, $\chi_{n|n-1}$ is the best estimate of the position before the time n measurements, $v_n$ is the velocity times the time between samples at time n. The resulting prediction of position is provided to both the terrain matching module, and the constrained extended Kalman filter. This prediction is used by the terrain matching module to generate the second observation of position.

The terrain matching module receives the bathymetry data, a measurement of the ocean's depth at the vessel's position and the vessel's final predicted state and computes the terrain based state estimate with a single point position match.

The terrain matching module takes as its inputs the position generated by the velocity update module, the measured ocean depth at the vessel's position and the high resolution bathymetry for the area of operation. The module then generates the best estimate of position based on maximum estimation principles. In the preferred embodiment, a reasonably dense, spatially varying bathymetric data set in the neighborhood of the vessel is used. Each point in this bathymetric data set is a triple, ai=(xi, yi, zi). Where xi, yi is the 2-dimensional position vector (eastings and northings) in meters and zi is the measured depth in meters. In a preferred embodiment this data has been previously collected however it may be collected concurrently with the underwater vehicle deployment.

Given the dead reckoning estimate of vessel position $\chi_n$ and the measured ocean depth at the vessel's position, $z_n$, the 3 dimension position vector, $a_{-n}=(\chi_n, z_n)$, can be formed using the same units as ai after rotating coordinate systems. Without loss of generality, it is assumed that the ocean bottom depth is measured directly beneath the vessel to simplify this exposition; in practice it may be necessary to correct for vessel orientation, which is possible through a set of rotations. If the true location of the vessel and ocean bottom depth is denoted as $a_n=(x, y, z)$, then the measurement error, defined as the difference between the true and dead reckoned positions, can be written as $e=a_n-a_{-n}$.

Viewed as an estimation problem, a maximum likelihood approach is used. That is, given several observations from a distribution with unknown parameters the value of the observation that maximizes the likelihood function is the best estimate of the parameters. The $a_n$ and $a_{-n}$ are related through the likelihood function (LF) based on a known or assumed error distributions, $fe$.

The LF can be expressed as:

$$L(\alpha_{i|\alpha n}^-) = f_a(\alpha_i - \alpha_n^-) \quad (3.5)$$

Given the estimated position $a_{-n}$ and the bathymetry in the area {ai} the most likely location of the vessel constrained to be in the bathymetric data set can be determined as that $a_i$ which maximizes $L(a_i|a_{-n})$. When applied to the bathymetric data set {ai}, (3.5) produces a measure which can be viewed as the weighted distance from the estimated position, $\chi_n$. Selecting the bathymetry triple which minimizes this distance is the maximum likelihood estimate of position constrained to the bathymetric data set.

The Terrain matching module employs the following relation:

$$\lambda(\alpha_i|\alpha_n^-) = (\alpha_i - \alpha_n^-)^T \Sigma^{-1} (\alpha_i - \alpha_n^-) \quad (3.7)$$

where $\alpha_i$ (alpha i) refers to data points from the bathymetry set, $\alpha_n$ (alpha n) is the 3D position vector formed by the measured depth at the position of the underwater vessel and the estimate of vessel position. (from the state velocity update) One assumes the error e is to be zero mean Gaussian with covariance Σ.

Because Σ is a covariance matrix and it is positive semidefinite, the likelihood function in (3.7) is strictly non-negative with minimum 0 at $a_i=a_{-n}$. The correct value for the covariance matrix varies depending on the nature of the bathymetric data being used.

The matrix given by Eqn. 3.8 contains the assumed variances in the position for each of the 3 axes.

$$\Sigma = \begin{bmatrix} \sigma_a^3 & 0 & 0 \\ 0 & \sigma_a^2 & 0 \\ 0 & 0 & \sigma_z^2 \end{bmatrix} \quad (3.8)$$

where $\sigma_a$ is the variance in the along track direction, $\sigma_c$ is the variance in the along track direction and $\sigma_z$ is the variance in the z direction. The resulting position from the Terrain matching module is the $\alpha_i$ (alpha i) that minimized Eqn. 3.7. Substituting this matrix into Equ. 3.7 and performing minimization generates the maximum likelihood estimate of position which is then passed to the constrained Kalman filter.

Figure 13:
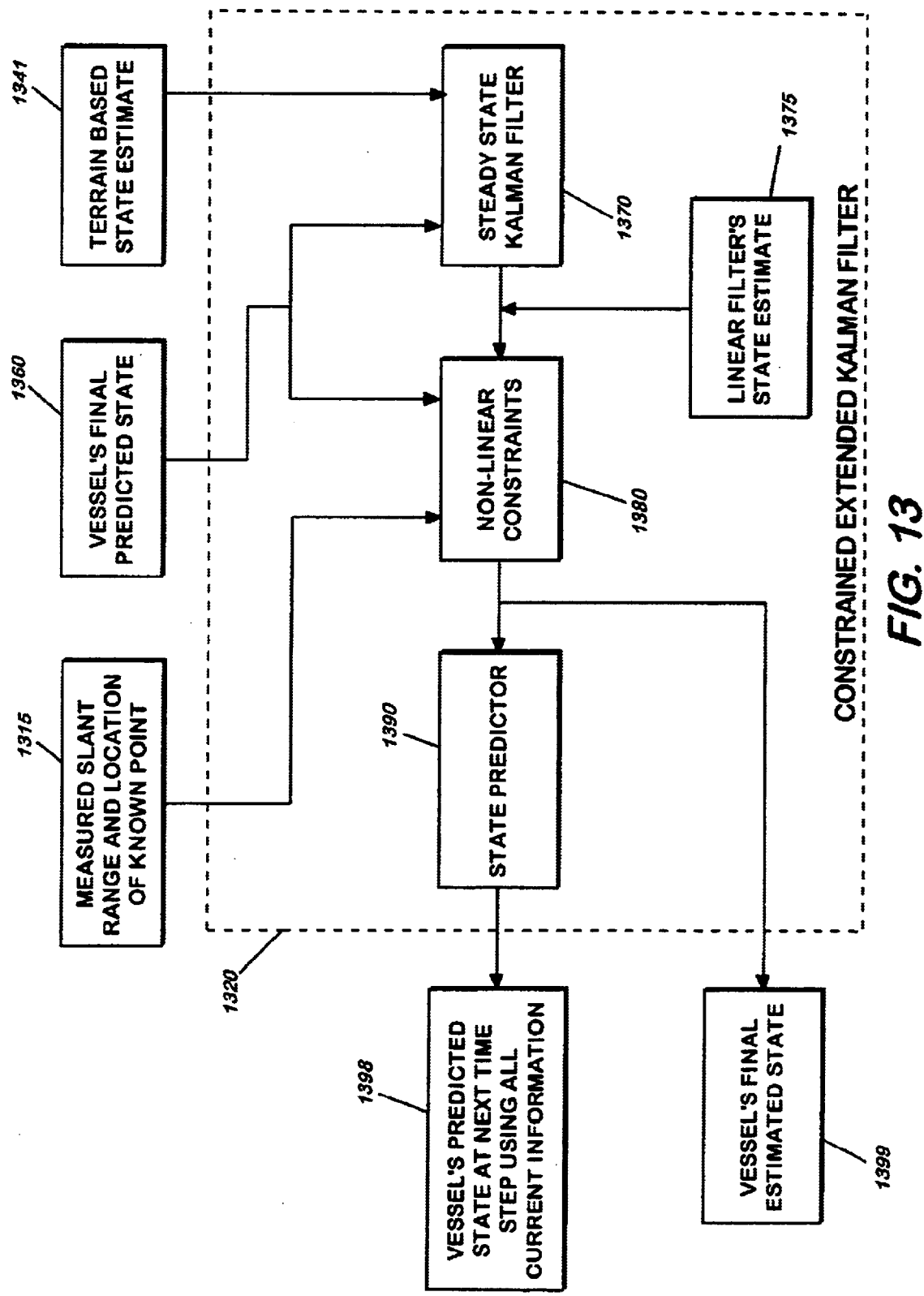
FIG. 13 shows a block diagram of constrained extended Kalman filter sub-system.

Three of the modules in the LOST2 system form the second subsystem of the LOST2 system, a constrained extended Kalman filter. FIG. 13 shows a block diagram of the constrained extended Kalman filter 1320 subsystem. The Kalman filter subsystem comprises a steady state extended Kalman filter 1370, a non-linear constraint module 1380, and a state predictor 1390. The steady state extended Kalman filter 1370 features nonlinear constraints that are placed on it to improve performance and stability given the poor nature of all models for underwater vessels.

The signal flow diagram of the constrained Kalman filter is shown in FIG. 13, builds on Kalman filter principles, extended to nonlinear systems, to integrate all of the state estimates into a single final state estimate 1399. This subsystem takes as input the terrain based state estimate 1341, a final predicted state 1360, the measured slant range and location of the known point 1315 and computes the final estimate of state 1399 and a prediction of the next system state 1398.

The extended Kalman filter that takes the previous estimate of the underwater vehicle's position, $\chi_{n|n-1}$, and the maximum liklihood estimator's estimate of the underwater vehicle's position, MLE(n), and computes a linear Kalman filter position estimate at time (n), $\chi_{n|n}$.

Figure 14:
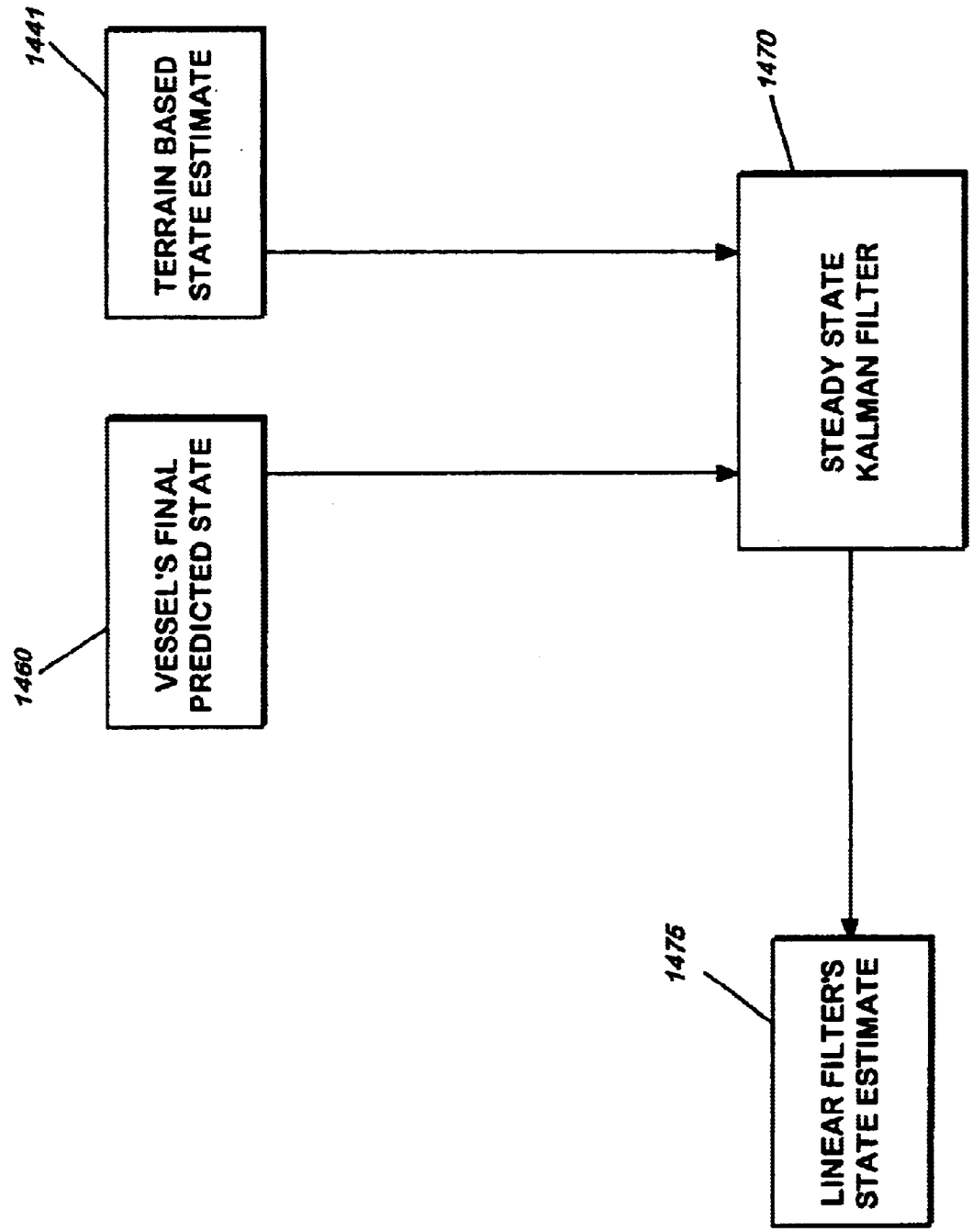
FIG. 14 shows a block diagram of the signal flow for the steady state Kalman filter.

The steady state Kalman filter, contained in FIG. 14, is the heart of the constrained extended Kalman filter subsystem 1320. Referring now to FIG. 14, this filter merges the two estimates of state in accordance with Kalman filter theory. This module takes as input the two estimates of state, the vessel's final predicted state, 1460 and the terrain based state estimate 1441, and outputs a linear combination of the two 1475.

The steady state Kalman filter receives the vessel's final predicted state and a terrain based state estimate from said system observer subsystem and computes the linear filter's state estimate therefrom.

After the prediction and observation steps of the Kalman filter are completed, the position estimates of the system observer must be merged. The terrain based observation (y) is merged with the prediction of the velocity update by means of a linear filter. The linear extended Kalman filter is the merging step of the constrained extended Kalman filter.

This module works in two steps. First the error or innovations of the system are computed by subtracting the observation from the prediction. The second step is to merge the innovations with the prediction via Kalman filter theory.

The innovations are computed by differencing the position obtained from the terrain match module (y) from the estimate of position at time n given all information at time n−1. In essence the innovations define the new information that is available at the present time step (n). The innovations are computed in each of the two independent directions separately. These 'innovations' can be expressed as:

$$\eta_n^a = y_n^\alpha - \hat{x}_{n|n-1}^\alpha \quad (4.15)$$

$$\eta_n^c = y_n^c - \hat{x}_{n|n-1}^c \quad (4.16)$$

After the innovations are defined, they are merged with the prediction in each direction by the Kalman gain K. This can be done in this manner due to the assumption that the system decouples into two independent systems.

The best Kalman filter estimate of position in eqn 4.17 and 4.18 is obtained by adding a portion of the innovations to the estimate of position at time n given all information at time n−1. The 'portion' is determined by K, the Kalman filter gain which is heuristically set for this system (extended Kalman filter) vs. computed (standard Kalman filter). Again following the Kalman principles, this is expressed as:

$$\hat{x}_{n|n}^a = \hat{x}_{n|n-1}^\alpha + K_n^\alpha \eta_n^a \quad (4.17)$$

$$\hat{x}_{n|n}^c = \hat{x}_{n|n-1}^c + K_n^c \eta_n^c \quad (4.18)$$

Figure 15:
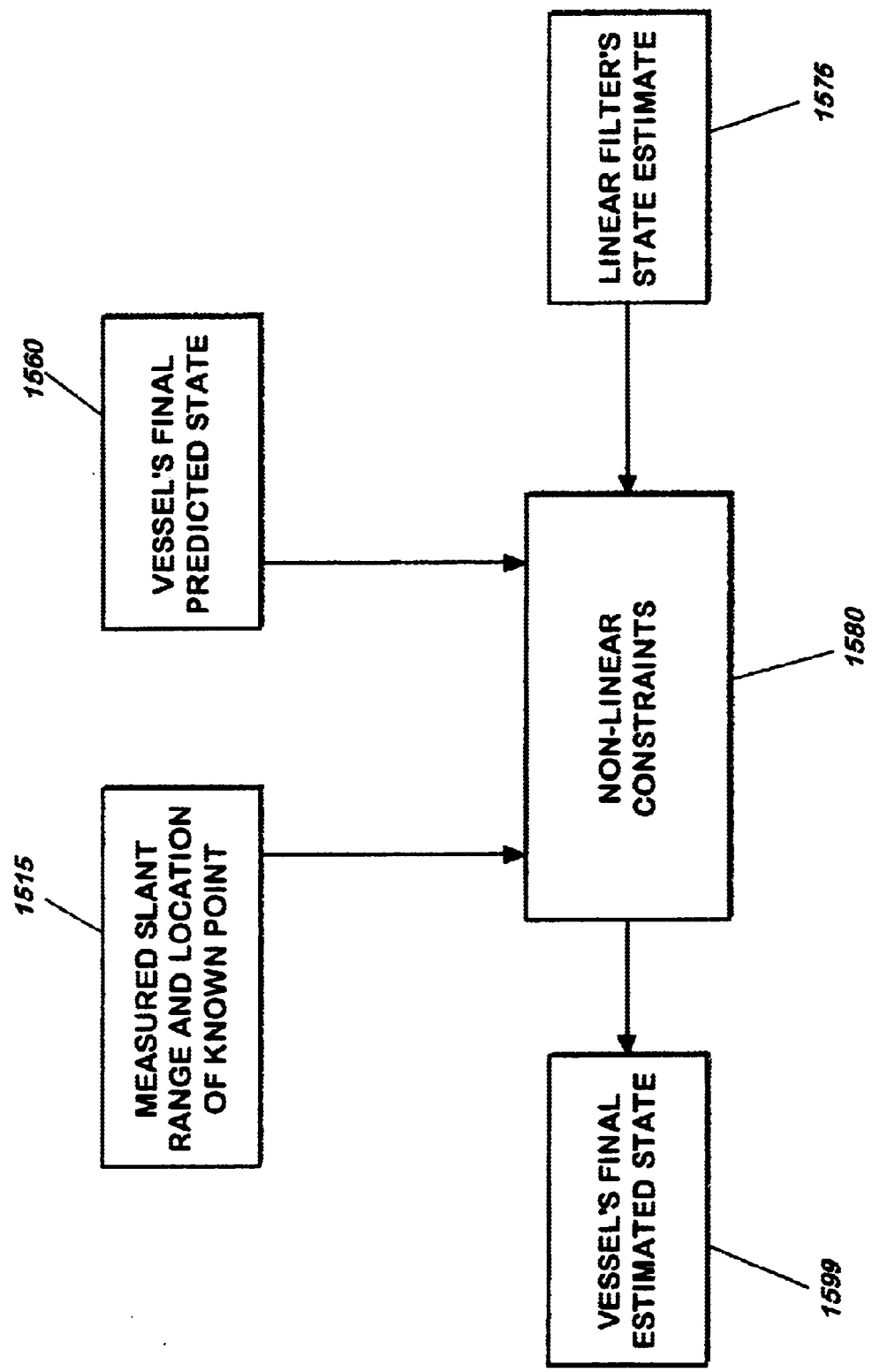
FIG. 15 shows a block diagram of the signal flow for nonlinear constraint module.

This module would in a normal extended Kalman filter complete one cycle through the filter algorithm. However, due to the unique nature of underwater vessels and this system, nonlinear constraints have been added to improve the system's performance. Due to the errors in linearization and the lack of a good system model, the linear filter's output must be constrained. This is done in two stages. First, the amount of change from the predicted state is thresholded. Secondly, the slant range is used to force the estimated location to be the correct distance from the known point. The nonlinear constraints module forms the constrained part of the constrained extended Kalman filter. A signal flow diagram for the nonlinear constraints module is shown in FIG. 15.

The non-linear constraint module 1580 receives the underwater vehicle's measured slant range and location of the known point 1515, and the vessel's final predicted state 1560 from the system observer subsystem, and the linear filter's state estimate 1575 and generates an estimate the vessel's final state 1599.

The Kalman filter has two problems associated with it, each of which are addressed by a separate set of nonlinear constraints. The first set of constraints serves to cull outliers from the system by means of a threshold. The threshold limits the distance that the system is allowed to change the predicted location. The second constraint is a slant range from a known point. This serves to aid in convergence and to prevent divergence.

The first set of constraints serves to cull the outliers from the observation module. These outliers may cause unpredictable performance. This is accomplished by comparing the difference between $\chi_{n|n-1}$ and $\chi_{n|n}$ in each direction and by limiting its magnitude to a certain value. Basically, it limits the change in estimated position from the Kalman filter in each axis to ε to prevent system divergence.

This may be expressed as:

$$\hat{x}_{n|n}^\alpha = \begin{cases} \hat{x}_{n|n-1}^\alpha - \epsilon & \hat{x}_{n|n}^\alpha - \hat{x}_{n|n-1}^\alpha < -\epsilon \\ \hat{x}_{n|n}^\alpha & \text{when } |\hat{x}_{n|n}^\alpha - \hat{x}_{n|n-1}^\alpha| \le \epsilon \\ \hat{x}_{n|n-1}^\alpha + \epsilon & \hat{x}_{n|n}^\alpha - \hat{x}_{n|n-1}^\alpha > \epsilon \end{cases} \quad (4.19)$$

$$\hat{x}_{n|n}^c = \begin{cases} \hat{x}_{n|n-1}^\alpha - \epsilon & \hat{x}_{n|n}^c - \hat{x}_{n|n-1}^c < -\epsilon \\ \hat{x}_{n|n}^\alpha & \text{when } |\hat{x}_{n|n}^c - \hat{x}_{n|n-1}^c| \le \epsilon \\ \hat{x}_{n|n-1}^c + \epsilon & \hat{x}_{n|n}^c - \hat{x}_{n|n-1}^c > \epsilon \end{cases} \quad (4.20)$$

These limits have the effect of trading convergence dime for a vast increase in stability. The unit ε is meters and a rule of thumb for a nominal value is 0.1 meters persecond. This is scaled by the sampling rate.

The other set of system constraints is the slant range correction. This corrects the estimated location of the vessel by forcing it to have the correct horizontal range (magnitude only) from the transponder. It does this by forming a line starting from the transponder and ending at the estimated vessel position. This line is then scaled by moving the estimated position along the line until the range is correct. This serves to increases convergence time by allowing for large movements in position and prevents divergence by preventing positions that are not realistic given the slant range information.

The nonlinear constraints distinguish this filter from other Kalman filters and are an extension of extended Kalman filters dictated by the nature of the system. By introducing nonlinearities into the linear system model, the system predicts the real dynamics better. The output of this module completes the merging of new information into the predicted location and is the best estimate as to the vessel's position.

Figure 16:
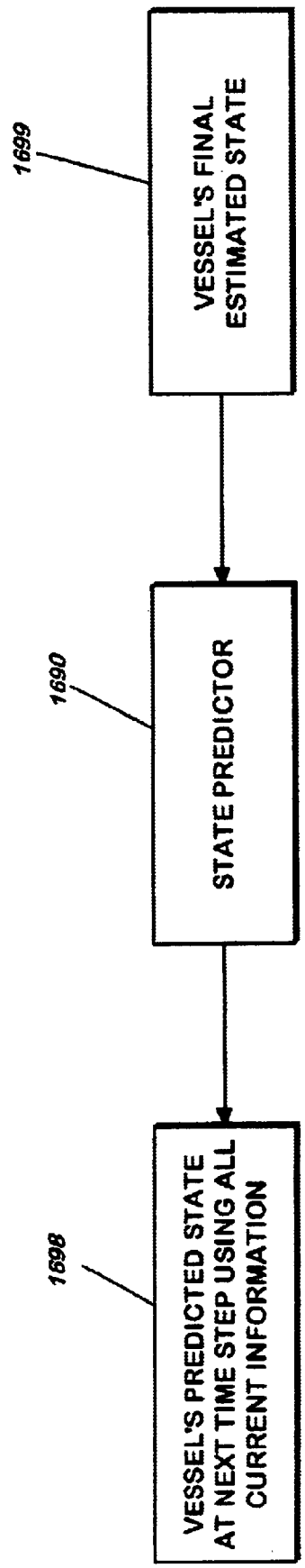
FIG. 16 shows a block diagram of the signal flow for the state predictor module.

The final module in the constrained extended Kalman filter is the state predictor, which is shown in FIG. 16. The state predictor module serves as part of the prediction stage of the Kalman filter.

This module computes an estimated position for the vessel in the along track, cross track coordinate system 1698 based on previous position estimates (stored internally).

The state predictor 1690 receives the vessel's final estimated state 1699 from the non linear constraint module and generates a prediction of the vessel's state at the next time step 1698 using the data generated for the current time step.

The state predictor thus acts as a range corrector that utilizes the linear Kalman filter position estimate at time (n), $\chi_{n|n}$, a sea borne position marker, and a measured slant range from the at least one submersible vehicle to the sea borne position marker and computes a final estimate of the at least one submersible vehicle's position.

This module projects the state ahead by keeping an internal running estimate of the unmeasured velocities and adds this to the final estimated state. This is the first stage in preparing one of the state estimates for the next time step.

The state predictor calculates the new position (along track, cross track) as two separate and independent processes, one in each direction. This is done throughout this system. For each direction, the position estimate is computed by adding a portion of the unmeasured estimated velocity in each direction. This is done by differencing the previous two position estimates and multiplying the result by 1-μ. The value of μ is different in each direction and for each specific system, but a ballpark Figure for the correct value is 0.1.

This provides an estimate of the vessels position at the next time step given all information known now, and it also serves to incorporate any unmeasured velocity which can be expressed for each axis as:

$$\hat{x}_{n+1|n}^{\alpha} = x_n^{\alpha} + (1-\mu_1)(x_n^{\alpha} - x_{n-1}^{\alpha}) \quad (4.21)$$

$$\hat{x}_{n+1|n}^{c} = x_n^{c} + (1-\mu_2)(x_n^{c} - x_{n-1}^{c}) \quad (4.22)$$

Note that x at n+1|n at time step n is equivalent to x at n|n−1 at the next time step which is the value used by the state velocity update module (with the measured velocity to determine the estimate of vessel position based upon dead-reckoning alone).

Note that the difference between x at n and n−1 is effectively using the last two position estimates to generate an estimate of vessel velocity independent of the vessel velocity input used by the state velocity updater. The resulting position estimate is then fed forward as one of the required inputs of the system observer.

Bathymetry data, position and velocity of the underwater vehicle over the sea bottom, ocean depth at the position of the underwater vehicle, the underwater vehicle's slant range to the position marker and the georectified location of the position marker may be stored in the memory or memory devices of a computer. The computer is also utilized to analytically determine the underwater vehicle's position using the bathymetry data, the slant range of the underwater vehicle to the position marker, position and velocity of the underwater vehicle over the sea bottom as well as displaying and storing the computed underwater vehicle's position. This analytically determined information may be displayed on either a video monitor or a printing device.

Although this invention has be described in relation to the exemplary embodiment's thereof, it is well understood by those skilled in the art that other variations and modifications can be affected on the preferred embodiment without departing from the scope and the spirit of the invention as set fourth in the claims.

What is claimed is:

1. A system for the accurate determination of the position of an underwater vehicle comprising:
    a sea borne position marker having a known position;
    at least one underwater vehicle acoustically coupled to the single position marker;
    a system observer comprising a state updater for predicting the underwater vehicle's position, $\chi_n$, based on a past estimate of the underwater vehicle's position, $\chi_{n|n-1}$ and an estimate of the underwater vehicle's velocity over the sea bottom, and a maximum likelihood estimator, to estimate the underwater vehicle's position (MLE(n)), utilizing measured ocean depth at the underwater vehicle's position, bathymetry data and the underwater vehicle's predicted position based on a past estimate of the underwater vehicle's position and an estimate of the underwater vehicle' velocity over the sea bottom, $\chi_n$ in a single point position match;
    an extended Kalman filter that takes state updater's estimate of the underwater vehicle's position, $\chi_n$, and the maximum likelihood estimator's estimate of the underwater vehicle's position, MLE(n), and computes a linear Kalman filter position estimate at time (n), $\chi_{n|n}$; and
    a range corrector that utilizes the linear Kalman filter position estimate at time (n), $\chi_{n|n}$, a sea borne position marker, and a measured slant range from the at least one submersible vehicle to the sea borne position marker and computes a final estimate of the at least one submersible vehicle's position.

2. A system for the accurate determination of the position of an underwater vehicle comprising:
    a sea borne position marker having a known position;
    means for acoustically coupling at least one underwater vehicle to the sea borne position marker;
    means for predicting the at least one underwater vehicle's position, based on a past estimate of the underwater vehicle's position and an estimate of the underwater vehicle's velocity over the sea bottom;
    means for estimating the underwater vehicle's position utilizing measured ocean depth at the underwater vehicle's position, bathymetry data and the underwater vehicle's predicted position in a single point position match;
    means for computing an estimate of the underwater vehicle's position based on the prediction of the at least one underwater vehicle's position based on vehicle dynamics and the estimated underwater vehicles position based on the measured ocean depth and bathymetry data;
    means for computing a corrected estimate of the at least one underwater vehicle's position that utilizes the estimate of the underwater vehicle's position, and a measured slant range from the at least one underwater vehicle to the sea borne position marker.

3. The system of claim 2, wherein said sea borne position marker having a known position comprises an acoustic ranging device mounted on a buoy.

4. The system of claim 2, wherein said sea borne position marker having a known position comprises an acoustic ranging device mounted on the sea floor.

5. The system of claim 2, wherein said sea borne position marker having a known position comprises an acoustic ranging device mounted on a vessel.

6. The system of claim 2, wherein said means for acoustically coupling comprises an acoustic transponder.

7. The system of claim 2 wherein said means for predicting the at least one underwater vehicle's position, based on a past estimate of the underwater vehicle's position and an estimate of the underwater vehicle's velocity over the sea bottom comprises a state velocity updater.

8. A system for the accurate determination of the position of an underwater vehicle comprising:
    a system observer subsystem having a state velocity update module, a terrain matching module for computing a terrain based state estimate, means for generating a prediction of the terrain matching module's performance; and
    a constrained extended Kalman filter subsystem having a steady state extended Kalman filter, a non-linear constraint module, and a state predictor;
    wherein the system observer subsystem integrates bathymetry data corresponding to the area of the underwater vehicle, with the underwater vehicle's measured ocean depth, the underwater vehicle's predicted state, the underwater vehicle's measured velocity into the terrain based state estimate and a final predicted state, the Kalman filter takes the terrain based state estimate, the final predicted state, a measured slant range and a location of the known point and computes a final estimate of the underwater vehicle's position and a prediction of the underwater vehicle's position at the next time step.

9. The system of claim 8 wherein said state velocity update module receives the underwater vehicle's predicted state using all of the information before the current time step, and the underwater vehicle's measured velocity and computes the underwater vehicle's final predicted state.

10. The system of claim 8 wherein said terrain matching module receives the bathymetry data, a measurement of the ocean's depth at the underwater vehicle's position and the underwater vehicle's final predicted state and computes the terrain based state estimate with a single point position match.

11. The system of claim 8 wherein said means for generating a prediction of the terrain matching module's performance comprises a performance prediction module which receives the bathymetry data and generates a spatial-based performance estimate.

12. The system of claim 8 wherein said steady state extended Kalman filter receives the underwater vehicle's final predicted state and the terrain based state estimate from said system observer subsystem and computes a linear filter's state estimate.

13. The system of claim 12 wherein said non-linear constraint module receives the underwater vehicle's measured slant range and location of the known point, the underwater vehicle's final predicted state from the system observer subsystem, and the linear filter's state estimate and generates an estimate of the vessel's underwater vehicle's final state.

14. The system of claim 8 wherein said state predictor receives the underwater vehicle's final estimated state form the non linear constraint module and generates a prediction of the underwater vehicle's state at the next time step using the data generated for the current time step.

15. A method for the accurate determination of the position of at least one underwater vehicle comprising:
   acoustically coupling at least one underwater vehicle to a sea borne position marker having a known position;
   predicting the at least one underwater vehicle's position, based on a past estimate of the underwater vehicle's position, and an estimate of its velocity over the sea bottom;
   estimating the underwater vehicle's position utilizing measured ocean depth at the underwater vehicle's position, bathymetry data and the underwater vehicle's predicted position in a single point terrain match;
   computing an estimate of the underwater vehicle's position based on the prediction of the at least one underwater vehicle's position based on vehicle dynamics and the estimated underwater vehicle's position based on the measured ocean depth and the bathymetry data with an extended Kalman filter; and
   computing a corrected estimate of the at least one underwater vehicle's position that utilizes the estimate of the underwater vehicle's position and a measured slant range from the at least one underwater vehicle to the sea borne position marker whose position is known.

16. A computer for the analytic determination of the position of at least one underwater vehicle acoustically coupled to a position marker having a known position using bathymetry data, positioning data, the underwater vehicle's velocity over the sea bottom, and a slant range from the position marker comprising:
   a computer for computing
      (a) a prediction of the underwater vehicle's position, $\chi_n$, based on a past estimate of the underwater vehicle's position, $\chi_{n|n-1}$ and an estimate of the underwater vehicle's velocity over the sea bottom with a state updater,
      (b) an estimate of the underwater vehicle's position (MLE(n)), utilizing measured ocean depth at the underwater vehicle's position, bathymetry data and the underwater vehicle's predicted position based on a past estimate of the underwater vehicle's position and an estimate of the underwater vehicle' velocity over the sea bottom, $\chi_n$ in a single point position match with a maximum likelihood estimator,
      (c) a linear Kalman filter position estimate at time (n), $\chi_{n|n}$ using the state updater's estimate of the underwater vehicle's position, $X_n$, and the maximum likelihood estimator's estimate of the underwater vehicle's position, MLE(n) with an extended Kalman filter, and
   a final estimate of the at least one submersible vehicle's position with a range corrector that utilizes the linear Kalman filter position estimate at time (n), $\chi_{n|n}$, a sea borne position marker, and a measured slant range from the at least one submersible vehicle to the sea borne position marker.

* * * * *

UNITED STATES PATENT AND TRADEMARK OFFICE
CERTIFICATE OF CORRECTION

PATENT NO. : 6,819,984 B1
DATED : November 16, 2004
INVENTOR(S) : Beckman et al.

It is certified that error appears in the above-identified patent and that said Letters Patent is hereby corrected as shown below:

Title page,
Items [12], [73] and [74], should read as follows:
-- [12] Beckman et al.
  [75] Inventors: Richard R. Beckman, Slidell, LA (US);
                   Andrew B. Martinez, New Orleans, LA (US);
                   Brian S. Bourgeois, Slidell, LA (US) --
  [74] *Attorney, Agent, or Firm* - John J. Karasek, Sally A. Ferrett, Chester L. Jordan, II --

Signed and Sealed this

Twenty-fifth Day of January, 2005

JON W. DUDAS
*Director of the United States Patent and Trademark Office*